(12) United States Patent
Liu et al.

(10) Patent No.: US 12,315,102 B2
(45) Date of Patent: May 27, 2025

(54) METHOD FOR RECOGNIZING IMAGES, ELECTRONIC DEVICE, AND NON-TRANSITORY STORAGE MEDIUM

(71) Applicant: HON HAI PRECISION INDUSTRY CO., LTD., New Taipei (TW)

(72) Inventors: Tsung-Wei Liu, New Taipei (TW); Chin-Pin Kuo, New Taipei (TW)

(73) Assignee: HON HAI PRECISION INDUSTRY CO., LTD., New Taipei (TW)

(*) Notice: Subject to any disclaimer, the term of this patent is extended or adjusted under 35 U.S.C. 154(b) by 339 days.

(21) Appl. No.: 17/896,820

(22) Filed: Aug. 26, 2022

(65) Prior Publication Data
US 2023/0394620 A1 Dec. 7, 2023

(30) Foreign Application Priority Data
Jun. 7, 2022 (CN) .......................... 202210639608.3

(51) Int. Cl.
G06T 3/18 (2024.01)
G06V 10/774 (2022.01)
(52) U.S. Cl.
CPC .............. G06T 3/18 (2024.01); G06V 10/774 (2022.01)

(58) Field of Classification Search
CPC ... G06T 3/18; G06T 3/00; G06T 2207/20081; G06V 10/774; G06V 10/764; G06V 10/82; G06N 3/08
See application file for complete search history.

(56) References Cited

U.S. PATENT DOCUMENTS

2022/0076391 A1* 3/2022 Kang ........................ G06T 7/80
2022/0138985 A1 5/2022 Li

FOREIGN PATENT DOCUMENTS

CN 110751602 2/2020

* cited by examiner

Primary Examiner — Juan M Guillermety
(74) Attorney, Agent, or Firm — ScienBiziP, P.C.

(57) ABSTRACT

A method for generating distorted images is applied in an electronic device, obtains first pixel coordinates of undistorted images and a first pixel value of the first pixel coordinates, and selects an arbitrary distortion center coordinate. The distance between the coordinate of the distortion center and each first pixel coordinate is calculated, and second pixel coordinates corresponding to the first pixel coordinates are calculated according to distortion coefficient, the first pixel coordinates, and the distance. The first pixel value of each first pixel coordinates is taken as the second pixel value of each second pixel coordinates, and distorted images from undistorted images are generated for training purposes according to the second pixel coordinates and the second pixel values.

18 Claims, 2 Drawing Sheets

METHOD FOR RECOGNIZING IMAGES, ELECTRONIC DEVICE, AND NON-TRANSITORY STORAGE MEDIUM

This application claims priority to Chinese Patent Application No. 202210639608.3 filed on Jun. 7, 2022, in China National Intellectual Property Administration, the contents of which are incorporated by reference herein.

FIELD

The subject matter herein generally relates to a field of image processing, in particular, relates to a method for generating distorted images and an electronic device.

BACKGROUND

At present, a trained deep learning model can realize functions such as image recognition and segmentation. However, the images captured by a camera may be distorted, and the degree of distortion of the images can vary, so that accurate identification and segmentation of the images by a simply-trained deep learning model is often not possible, causing inaccurate recognition and inaccurate segmentation of distorted images.

BRIEF DESCRIPTION OF THE DRAWINGS

Implementations of the present disclosure will now be described, by way of embodiment, with reference to the attached figures.

DETAILED DESCRIPTION

Figure 1:
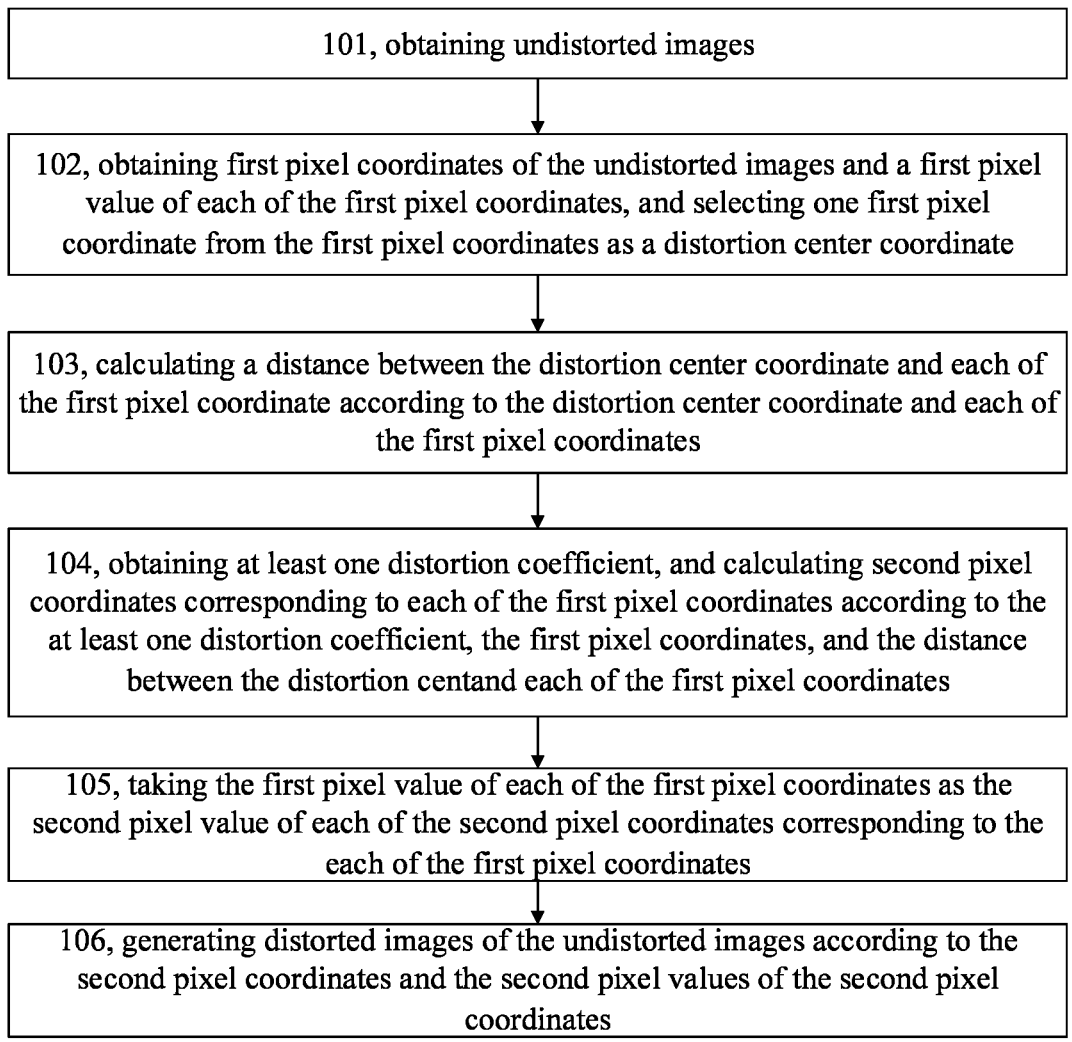
FIG. 1 is a flowchart of one embodiment of a method for generating distorted images according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one".

The term "module", as used herein, refers to logic embodied in hardware or firmware. or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives. The term "comprising" means "including, but not necessarily limited to"; it specifically indicates open-ended inclusion or membership in a so-described combination, group, series, and the like.

FIG. 1 illustrates a method for generating distorted images. The method is applied in an electronic device (referring, to FIG. 2). The electronic device can be any electronic product that can interact with a user, such as a personal computer, a tablet computer, a smart phone, a Personal Digital Assistant (PDA), a game console, an Internet Protocol Television (IPTV), a smart wearable device, etc.

The electronic device is a device that can automatically perform numerical calculation and/or information processing according to pre-set or stored instructions, and its hardware includes, but is not limited to, a microprocessor, an Application Specific Integrated Circuit (ASIC), a Field-Programmable Gate Array (FPGA), a Digital Signal Processor (DSP), an embedded device, etc.

In one embodiment, the electronic device may also include a network device and/or a user device. The network device includes, but is not limited to, a single network server, a server group consisting of multiple network servers, or a cloud server consisting of a large number of hosts or network servers.

A network connected to the electronic device includes, but is not limited to, the Internet, a wide area network, a metropolitan area network, a local area network, a Virtual Private Network (VPN), etc.

The method is provided by way of example, as there are a variety of ways to carry out the method. Each block shown in FIG. 1 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 101.

At block 101, obtaining undistorted images.

In one embodiment, the undistorted image includes images processed by a distortion correction. The undistorted images can be, but not limited to, images of a road scene, images of an industrial product, or any other.

In one embodiment, obtaining undistorted images includes: obtaining the images of the road scene or the images of the industrial product by a distortion-corrected camera as the undistorted images. In one embodiment, obtaining undistorted images includes generating true and undistorted images and obtaining distorted images.

In one embodiment, the method further includes: performing data enhancement operations on the undistorted images, and obtaining different undistorted images. The data enhancement operations include, but are not limited to, an image flipping operation, an image rotation operation, an image scaling operation, and an image cropping operation. It should be noted that the data augmentation operations effectively expands the undistorted images, thereby expanding the number of training samples.

At block 102, obtaining first pixel coordinates of the undistorted images and a first pixel value of each of the first pixel coordinates, and selecting one first pixel coordinate from the first pixel coordinates as a distortion center coordinate.

In one embodiment, obtaining first pixel coordinates of the undistorted images includes: obtaining the first pixel coordinates of the undistorted image based on an OpenCV method. In one embodiment, coordinates of all pixels in the undistorted images are obtained.

In one embodiment, obtaining the first pixel value of each of the first pixel coordinates includes: obtaining the first pixel value of each of the first pixel coordinates of the undistorted images based on the OpenCV method. In one embodiment, the first pixel value is represented by RGB values. For example, the first pixel coordinate is (1750, 160), and the corresponding first pixel value of the first pixel coordinate is (113, 65, 79), wherein, a value of R is 113, a value of G is 65, and a value of B is 79.

In one embodiment, selecting one first pixel coordinate from the first pixel coordinates as the distortion center coordinate includes: selecting an arbitrary pixel coordinate from all the first pixel coordinates as the distortion center coordinate, wherein the distortion center represents a reference center of the degree of distortion from different fields of view, the farther the field of view being from the distortion center, the larger being the distortion amount. In one embodiment, the farther from the distortion center of the first pixel coordinates, the larger the amount of distortion of the first pixel coordinate.

It can be understood that any of the first pixel coordinates may be used as the distortion center, and any of the first pixel coordinates may be originally selected as the distortion center to generate more distorted images.

At block 103, calculating a distance between the distortion center coordinate and each of the first pixel coordinate according to the distortion center coordinate and each of the first pixel coordinates.

In one embodiment, the calculation of a distance between the distortion center coordinate and each of the first pixel coordinate according to the distortion center coordinate and each of the first pixel coordinates includes:

calculating the distance between the distortion center coordinate and each of the first pixel coordinates according to a formula of $r_d = \sqrt{(x_d-x_0)^2+(y_d-y_0)^2}$, wherein $r_d$ represents the distance, $(x_d, y_d)$ represents the first pixel coordinate, and $(x_0, y_0)$ represents the coordinate of the distortion center.

In one embodiment, each of the first pixel coordinates and the distortion center coordinate can be substituted into the above formula, and the distance between the distortion center and each of the first pixel coordinates can be calculated by the above formula.

At block 104, obtaining at least one distortion coefficient and calculating second pixel coordinates corresponding to each of the first pixel coordinates according to the at least one distortion coefficient, the first pixel coordinates, and the distance between the distortion center coordinate and each of the first pixel coordinates.

In one embodiment, the distortion coefficient will change a degree of distortion of distorted images, and the distortion coefficient can be obtained from a camera.

In one embodiment, calculating the second pixel coordinate corresponding to each of the first pixel coordinates includes:

calculating the second pixel coordinate according to a first formula $$\begin{cases} x_u = \dfrac{x_d}{\left(1+\lambda_1 r_d^2 + \lambda_2 r_d^4 + \ldots + \lambda_k r_d^{2k}\right)} \\ y_u = \dfrac{y_d}{\left(1+\lambda_1 r_d^2 + \lambda_2 r_d^4 + \ldots + \lambda_k r_d^{2k}\right)} \end{cases},$$

wherein $(x_u, y_u)$ represents the second pixel coordinate, $(x_d, y_d)$ represents the first pixel coordinate, $r_d$ represents the distance between the distortion center coordinate and each of the first pixel coordinates, k is a positive integer, and $\lambda_1, \lambda_2, \ldots \lambda_k$ are the distortion coefficients. In one embodiment, the larger the k value, the larger the degree of distortion.

In one embodiment, each of the first pixel coordinates, the distance, the distortion coefficients, and the k value are substituted into the first formula, and the second pixel coordinate can be calculated from the first formula.

In another embodiment, calculating the second pixel coordinate corresponding to each of the first pixel coordinates includes:

calculating the second pixel coordinate according to a second formula $$\begin{cases} x_u = \dfrac{x_d}{\left[(2\mu_1 x_d y_d + \mu_2(r_d^2+2x_d^2)\right]} \\ y_u = \dfrac{y_d}{\left[(2\mu_2 x_d y_d + \mu_1(r_d^2+2y_d^2)\right]} \end{cases},$$

wherein $(x_u, y_u)$ represents the second pixel coordinate, $(x_d, y_d)$ represents the first pixel coordinate, $r_d$ represents the distance between the distortion center coordinate and each of the first pixel coordinates, and $\mu_1$ and $\mu_2$ are the distortion coefficients.

In one embodiment, each of the first pixel coordinates, the above distance, and the distortion coefficients are substituted into the second formula, and the second pixel coordinate can be calculated by the second formula.

At block 105, taking the first pixel value of each of the first pixel coordinates as the second pixel value of each of the second pixel coordinates corresponding to the each of the first pixel coordinates.

In one embodiment, the first pixel value of each of the first pixel coordinates is used as the second pixel value of each of the second pixel coordinates. For example, a first pixel coordinate is (1750, 60), the corresponding first pixel value is (113, 65, 79), the second pixel coordinate calculated by the first formula or the second formula is (1230, 132), and the second pixel value of the second pixel coordinate is determined as (113, 65, 79).

At block 106, generating distorted images of the undistorted images according to the second pixel coordinates and the second pixel values of the second pixel coordinates. In one embodiment, the distorted images of the undistorted images are generated according to the second pixel coordinates and the second pixel values of the second pixel coordinates.

In one embodiment, the method further includes: determining a distortion type according to the second pixel coordinates; generating the distortion images of the distortion type according to the distortion type, the second pixel coordinates and the second pixel values.

In one embodiment, the distortion types include a radial distortion type and a tangential distortion type. In one embodiment, determining the distortion type according to the second pixel coordinates includes: calculating the second pixel coordinates by the first formula, and determining the distortion type as the radial distortion type; calculating the second pixel coordinate by the second formula, and determining the distortion type as the tangential distortion type.

In one embodiment, the method further includes training a deep learning model using the undistorted images and the distorted images.

In one embodiment, the distorted images include the distorted images in different degrees of distortion and the distorted images of different distortion types. In one embodiment, the deep learning model can also be any one of AlexNet network model, VGGNet network model, GoogLeNet network model, ResNet network model, DenseNet network model, SSDNet network model, RCNN network model, YOLO series network models, FCN network model, and SegNet network model. This present application does not specifically limit the type of the deep learning model.

In one embodiment, the deep learning model for classifying objects is the ResNet network model the distorted images are input into the ResNet network model for training, thereby improving a robustness and range of the ResNet network model and an accuracy of object classification. In one embodiment, the deep learning model detects the appearance of target objects in images by using the RCNN network model, the distorted images are input into the RCNN network model for training, result in improving the robustness of the RCNN network model and the accuracy of distinguishing objects. In one embodiment, the deep learning model for segmentation of a target object in images is the FCN network model, and the distorted images are input into the FCN network model for training, thereby improving the robustness of the FCN network model and improving the accuracy of segmentation.

The present application uses images with different degrees of distortion and images of different distortion types, together with the undistorted images, to train the deep learning model, thus, the deep learning model can identify images with different distortions, thereby improving the accuracy and robustness of the deep learning model.

An electronic device can obtain images by a camera and input the images into a trained deep learning model to realize image recognition, image segmentation, and other operations. However, the obtained images may have different distortions due to insufficient correction of the camera, resulting in an inability of the deep learning model to accurately identify and segment the images, decreasing the accuracy of the trained deep learning model. The present application trains a deep learning model with images in different degrees of distortion and with images in different types of distortion, so that the trained deep learning model can recognize images even when distorted, regardless of whether the camera has corrected or applied correction to the images. In short, regardless of whether the images are distorted or undistorted, the trained deep learning model can recognize and segment such images, thereby reducing a dependence on camera correction and improving the accuracy and robustness of the deep learning model.

The above embodiments are only specific embodiments of the present application, but a protection scope of the present application is not limited to these. For those of ordinary skill in the art, improvements can be made without departing from the inventive concept of the present application, but these all belong to the protection scope of the present application.

Figure 2:
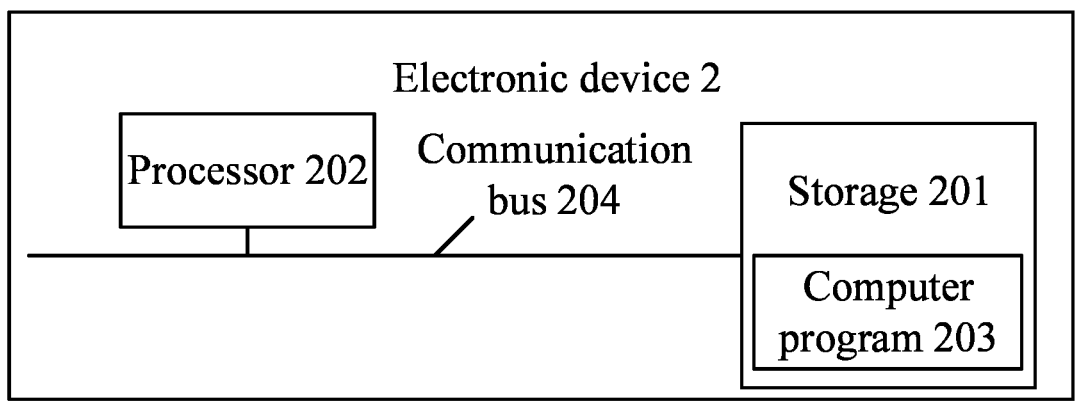
FIG. 2 is a schematic diagram of one embodiment of an electronic device employing the method according to the present disclosure.

FIG. 2 illustrates the electronic device 2. The electronic device 2 includes a storage 201, at least one processor 202, a computer program 203 stored in the storage 201, and at least one communication bus 204.

Those skilled in the art can understand that FIG. 2 shows only an example of the electronic device 2, and does not constitute a limitation on the electronic device 2. Other examples may include more or less components than those shown in the drawings, or have different combinations of components, or different components, for example, the electronic device 5 may also include input and output devices, network access devices, and the like.

The at least one processor 202 may be a Central Processing Unit (CPU), and may also be a general-purpose processor, a Digital Signal Processors (DSP), an Application Specific Integrated Circuit (ASIC), a Field-Programmable Gate Array (FPGA) or other programmable logic devices, discrete gate or transistor logic devices, discrete hardware components, etc. The at least one processor 202 can be a microprocessor or the at least one processor 202 can also be any conventional processor, etc. The at least one processor 202 is the control center of the electronic device 2, using various interfaces and lines to connect various parts of the entire electronic device 2.

The storage 201 can be used to store the computer program 203, and the at least one processor 202 implements the electronic program by executing the computer program 203 stored in the storage 201 and calling up the data stored in the storage 201. The storage 201 may include a stored program area and a stored data area, wherein the stored program area may store an operating system, and an application program required for at least one function (such as a sound playback function, an image playback function, etc.), etc. The storage data area may store data (such as audio data) created according to the use of the electronic device 2, etc. In addition, the storage 201 may include non-volatile storage such as a hard disk, an internal memory, a plug-in hard disk, a Smart Media Card (SMC), a Secure Digital (SD) card, a Flash Card (Flash Card), at least one disk storage device, flash memory device, or other non-volatile solid state storage device.

In one embodiment, the modules/units integrated in the electronic device 2 can be stored in a computer readable storage medium if such modules/units are implemented in the form of an independent product. Thus, the present disclosure may be implemented and realized in any part of the method of the foregoing embodiments, or may be implemented by the computer program, which may be stored in the computer readable storage medium. The steps of the various method embodiments described above may be implemented by a computer program when executed by a processor. The computer program includes computer program code, which may be in the form of source code, object code form, executable file, or some intermediate form. The computer readable medium may include any entity or device capable of carrying the computer program code, a recording medium, a USB flash drive, a removable hard disk, a magnetic disk, an optical disk, a computer memory, a read-only memory (ROM).

The exemplary embodiments shown and described above are only examples. Even though numerous characteristics and advantages of the present disclosure have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims.

What is claimed is:

1. A method for recognizing images, applied in an electronic device, the method comprising:
   obtaining undistorted images;
   obtaining first pixel coordinates of the undistorted images and a first pixel value of each of the first pixel coordinates;
   selecting one first pixel coordinate from the first pixel coordinates as a distortion center coordinate, comprising: selecting any one of the first pixel coordinates as the distortion center coordinate, wherein a distortion center represents a reference center of distortion degree from different fields of view, the farther one field of view being from the distortion center, the larger being the distortion amount of the field of view;
   calculating a distance between the distortion center coordinate and each of the first pixel coordinates;
   obtaining at least one distortion coefficient, and calculating second pixel coordinates corresponding to each of the first pixel coordinates according to the at least one distortion coefficient, the first pixel coordinates, and the distance between the distortion center coordinate and each of the first pixel coordinates;
   taking the first pixel value of each of the first pixel coordinates as the second pixel value of each of the second pixel coordinates corresponding to each of the first pixel coordinates; and
   generating distorted images of the undistorted images according to the second pixel coordinates and the second pixel values of the second pixel coordinates, and the distorted images having different distortion degrees and different distortion types;
   training a deep learning model by using the undistorted images and the distorted images;
   recognizing the distorted images by trained deep learning model.

2. The method as claimed in claim 1, further comprising:
   determining a distortion type according to the second pixel coordinates;
   generating the distortion images of the distortion type according to the distortion type, the second pixel coordinates and the second pixel values of the second pixel coordinates.

3. The method as claimed in claim 2, wherein the distortion types comprise a radial distortion type and a tangential distortion type.

4. The method as claimed in claim 1, further comprising:
   calculating the distance between the distortion center coordinate and each of the first pixel coordinates according to a formula of $r_d = \sqrt{(x_d-x_0)^2+(y_d-y_0)^2}$, wherein $r_d$ represents the distance, $(x_d,y_d)$ represents one first pixel coordinate, and $(x_0,y_0)$ represents the coordinate of the distortion center.

5. The method as claimed in claim 4, further comprising:
   calculating one second pixel coordinate according to a second formula of $$\begin{cases} x_u = \dfrac{x_d}{[(2\mu_1 x_d y_d + \mu_2(r_d^2 + 2x_d^2)]} \\ y_u = \dfrac{y_d}{[(2\mu_2 x_d y_d + \mu_1(r_d^2 + 2y_d^2)]} \end{cases},$$

wherein $(x_u,y_u)$ represents the second pixel coordinate, $(x_d,y_d)$ represents one first pixel coordinate, $r_d$ represents the distance between the distortion center coordinate and each of the first pixel coordinates, $\mu_1$ and $\mu_2$ are the distortion coefficients.

6. The method as claimed in claim 1, further comprising:
   calculating one second pixel coordinate according to a first formula of $$\begin{cases} x_u = \dfrac{x_d}{\left(1 + \lambda_1 r_d^2 + \lambda_2 r_d^4 + \ldots + \lambda_k r_d^{2k}\right)} \\ y_u = \dfrac{y_d}{\left(1 + \lambda_1 r_d^2 + \lambda_2 r_d^4 + \ldots + \lambda_k r_d^{2k}\right)} \end{cases},$$

wherein $(x_u,y_u)$ represents the second pixel coordinate, $(x_d,y_d)$ represents one first pixel coordinate, $r_d$ represents the distance between the distortion center coordinate and each of the first pixel coordinates, k is a positive integer, $\lambda_1, \lambda_2 \ldots \lambda_k$ are distortion coefficients.

7. The method as claimed in claim 1, further comprising:
   performing data enhancement operations on the undistorted images, and obtaining different undistorted images, wherein the data enhancement operations comprise an image flipping operation, an image rotation operation, an image scaling operation, and an image cropping operation.

8. An electronic device comprising: a processor; and a non-transitory storage medium coupled to the processor and configured to store a plurality of instructions, which cause the processor to:
   obtain undistorted images;
   obtain first pixel coordinates of the undistorted images and a first pixel value of each of the first pixel coordinates;
   select one first pixel coordinate from the first pixel coordinates as a distortion center coordinate, comprising:
   selecting any one of the first pixel coordinates as the distortion center coordinate, wherein a distortion center represents a reference center of distortion degree from different fields of view, the farther one field of view being from the distortion center, the larger being the distortion amount of the field of view;
   calculate a distance between the distortion center coordinate and each of the first pixel coordinate;
   obtain at least one distortion coefficient, and calculate second pixel coordinates corresponding to each of the first pixel coordinates according to the at least one distortion coefficient, the first pixel coordinates, and the distance between the distortion center coordinate and each of the first pixel coordinates;
   take the first pixel value of each of the first pixel coordinates as the second pixel value of each of the second pixel coordinates corresponding to the each of the first pixel coordinates; and
   generate distorted images of the undistorted images according to the second pixel coordinates and the second pixel values of the second pixel coordinates, and the distorted images having different distortion degrees and different distortion types;
   train a deep learning model by using the undistorted images and the distorted images;
   recognize the distorted images by trained deep learning model.

9. The electronic device as claimed in claim 8, wherein the plurality of instructions are further configured to cause the processor to:

determine a distortion type according to the second pixel coordinates;
generate the distortion images of the distortion type according to the distortion type, the second pixel coordinates and the second pixel values of the second pixel coordinates.

10. The electronic device as claimed in claim 9, wherein the distortion types comprises a radial distortion type and a tangential distortion type.

11. The electronic device as claimed in claim 8, wherein the plurality of instructions are further configured to cause the processor to:
calculate the distance between the distortion center coordinate and each of the first pixel coordinates according to a formula of $r_d = \sqrt{(x_d-x_0)^2+(y_d-y_0)^2}$, wherein $r_d$ represents the distance, $(x_d,y_d)$ represents one first pixel coordinate, and $(x_0,y_0)$ represents the coordinate of the distortion center.

12. The electronic device as claimed in claim 11, wherein the plurality of instructions are further configured to cause the processor to:
calculate one second pixel coordinate according to a second formula $$\begin{cases} x_u = \dfrac{x_d}{[(2\mu_1 x_d y_d + \mu_2(r_d^2 + 2x_d^2)]} \\ y_u = \dfrac{y_d}{[(2\mu_2 x_d y_d + \mu_1(r_d^2 + 2y_d^2)]} \end{cases},$$

wherein $(x_u,y_u)$ represents the second pixel coordinate, $(x_d,y_d)$ represents one first pixel coordinate, $r_d$ represents the distance between the distortion center coordinate and each of the first pixel coordinates, $\mu_1$ and $\mu_2$ are the distortion coefficients.

13. The electronic device as claimed in claim 8, wherein the plurality of instructions are further configured to cause the processor to:
calculate one second pixel coordinate according to a first formula $$\begin{cases} x_u = \dfrac{x_d}{(1+\lambda_1 r_d^2 + \lambda_2 r_d^4 + \ldots + \lambda_k r_d^{2k})} \\ y_u = \dfrac{y_d}{(1+\lambda_1 r_d^2 + \lambda_2 r_d^4 + \ldots + \lambda_k r_d^{2k})} \end{cases},$$

wherein $(x_u,y_u)$ represents the second pixel coordinate, $(x_d,y_d)$ represents one first pixel coordinate, $r_d$ represents the distance between the distortion center coordinate and each of the first pixel coordinates, k is a positive integer, $\lambda_1, \lambda_2 \ldots \lambda_z$ are distortion coefficients.

14. The electronic device as claimed in claim 8, wherein the plurality of instructions are further configured to cause the processor to:
perform data enhancement operations on the undistorted images, and obtain different undistorted images, wherein the data enhancement operations comprises an image flipping operation, an image rotation operation, an image scaling operation, and an image cropping operation.

15. A non-transitory storage medium having stored thereon instructions that, when executed by at least one processor of an in-vehicle device, causes the least one processor to execute instructions of a method for recognizing images, the method comprising:
obtaining undistorted images;
obtaining first pixel coordinates of the undistorted images and a first pixel value of each of the first pixel coordinates;
selecting one first pixel coordinate from the first pixel coordinates as a distortion center coordinate, comprising: selecting any one of the first pixel coordinates as the distortion center coordinate, wherein a distortion center represents a reference center of distortion degree from different fields of view, the farther one field of view being from the distortion center, the larger being the distortion amount of the field of view;
calculating a distance between the distortion center coordinate and each of the first pixel coordinate;
obtaining at least one distortion coefficient, and calculating second pixel coordinates corresponding to each of the first pixel coordinates according to the at least one distortion coefficient, the first pixel coordinates, and the distance between the distortion center coordinate and each of the first pixel coordinates;
taking the first pixel value of each of the first pixel coordinates as the second pixel value of each of the second pixel coordinates corresponding to the each of the first pixel coordinates;
generating distorted images of the undistorted images according to the second pixel coordinates and the second pixel values of the second pixel coordinates, and the distorted images having different distortion degrees and different distortion types;
training a deep learning model by using the undistorted images and the distorted images;
recognizing the distorted images by trained deep learning model.

16. The non-transitory storage medium as recited in claim 15, wherein the method comprising:
determining a distortion type according to the second pixel coordinates;
generating the distortion images of the distortion type according to the distortion type, the second pixel coordinates and the second pixel values of the second pixel coordinates.

17. The non-transitory storage medium as recited in claim 15, wherein the method comprising:
calculating the distance between the distortion center coordinate and each of the first pixel coordinates according to a formula of $r_d=\sqrt{(x_d-x_0)^2+(y_d-y_0)^2}$, wherein $r_d$ represents the distance, $(x_d,y_d)$ represents one first pixel coordinate, and $(x_0,y_0)$ represents the coordinate of the distortion center.

18. The non-transitory storage medium as recited in claim 15, wherein the method comprising:
calculating one second pixel coordinate according to a first formula $$\begin{cases} x_u = \dfrac{x_d}{(1+\lambda_1 r_d^2 + \lambda_2 r_d^4 + \ldots + \lambda_k r_d^{2k})} \\ y_u = \dfrac{y_d}{(1+\lambda_1 r_d^2 + \lambda_2 r_d^4 + \ldots + \lambda_k r_d^{2k})} \end{cases},$$

wherein $(x_u,y_u)$ represents the second pixel coordinate, $(x_d,y_d)$ represents one first pixel coordinate, $r_d$ represents the distance between the distortion center coordinate and each of the first pixel coordinates, k is a positive integer, $\lambda_1, \lambda_2 \ldots \lambda_k$ are distortion coefficients.

* * * * *